US008686860B2

(12) United States Patent
Boldyrev et al.

(10) Patent No.: US 8,686,860 B2
(45) Date of Patent: Apr. 1, 2014

(54) METHOD AND APPARATUS FOR RETRIEVING CONTENT VIA A SERVICE ENDPOINT

(75) Inventors: Sergey Boldyrev, Söderkulla (FI); Ian Justin Oliver, Söderkulla (FI); Joni Jorma Marius Jantunen, Helsinki (FI); Jarmo Tapani Arponen, Espoo (FI); Sergey Balandin, Helsinki (FI)

(73) Assignee: Nokia Corporation, Espoo (FI)

( * ) Notice: Subject to any disclaimer, the term of this patent is extended or adjusted under 35 U.S.C. 154(b) by 662 days.

(21) Appl. No.: 12/552,094

(22) Filed: Sep. 1, 2009

(65) Prior Publication Data
US 2011/0055351 A1    Mar. 3, 2011

(51) Int. Cl.
G08B 13/14    (2006.01)

(52) U.S. Cl.
USPC .................. 340/572.2; 709/212; 709/217

(58) Field of Classification Search
USPC ............... 709/203, 212, 217, 238; 340/572.2
See application file for complete search history.

(56) References Cited

U.S. PATENT DOCUMENTS

| 7,274,909 | B2 | 9/2007 | Perttilaet et al. | |
| 7,545,271 | B2 | 6/2009 | Jalkanen et al. | |
| 7,873,723 | B2 * | 1/2011 | Lyon et al. | 709/224 |
| 2004/0176032 | A1 * | 9/2004 | Kotola et al. | 455/41.2 |
| 2006/0106920 | A1 * | 5/2006 | Steeb et al. | 709/220 |
| 2006/0253590 | A1 * | 11/2006 | Nagy et al. | 709/226 |
| 2007/0121641 | A1 * | 5/2007 | Hovey et al. | 370/395.2 |
| 2007/0159330 | A1 * | 7/2007 | Chakraborty et al. | 340/572.1 |
| 2008/0143485 | A1 * | 6/2008 | Frerking | 340/10.1 |
| 2009/0058647 | A1 | 3/2009 | Dennard et al. | |
| 2009/0100946 | A1 * | 4/2009 | Balinsky et al. | 73/866 |
| 2009/0234472 | A1 | 9/2009 | Pyle | |
| 2009/0248794 | A1 * | 10/2009 | Helms et al. | 709/203 |
| 2009/0258678 | A1 | 10/2009 | Chava et al. | |
| 2010/0051692 | A1 * | 3/2010 | Knudson et al. | 235/439 |
| 2010/0281178 | A1 * | 11/2010 | Sullivan | 709/231 |

FOREIGN PATENT DOCUMENTS

| EP | 2 063 365 A1 | 5/2009 |
| WO | 2005/081088 A1 | 9/2005 |

OTHER PUBLICATIONS

Rodriguez, M., et al.: Location-Aware Access to Hospital Information and Services. IEEE Transactions on Information Technology in Biomedicine, vol. 8, No. 4, Dec. 2004, pp. 1-8, http://pmlab.iecs.fcu.edu.tw/PP/Papers/RF/RFMM04.pdf.

* cited by examiner

*Primary Examiner* — Phuoc Nguyen
(74) *Attorney, Agent, or Firm* — Ditthavong Mori & Steiner, P.C.

(57) ABSTRACT

An approach is provided for retrieving ordered content via a service endpoint. A radio frequency memory tag is preloaded with content managed by a service platform. A request is generated for content stored on the radio frequency memory tag of an endpoint associated with the service platform. Transmission of the request to the endpoint is initiated. The request for the content is received from a user equipment. Transmission of the content is initiated from the memory tag to the user equipment. The user equipment receives the content from the memory tag in response to the request.

20 Claims, 9 Drawing Sheets

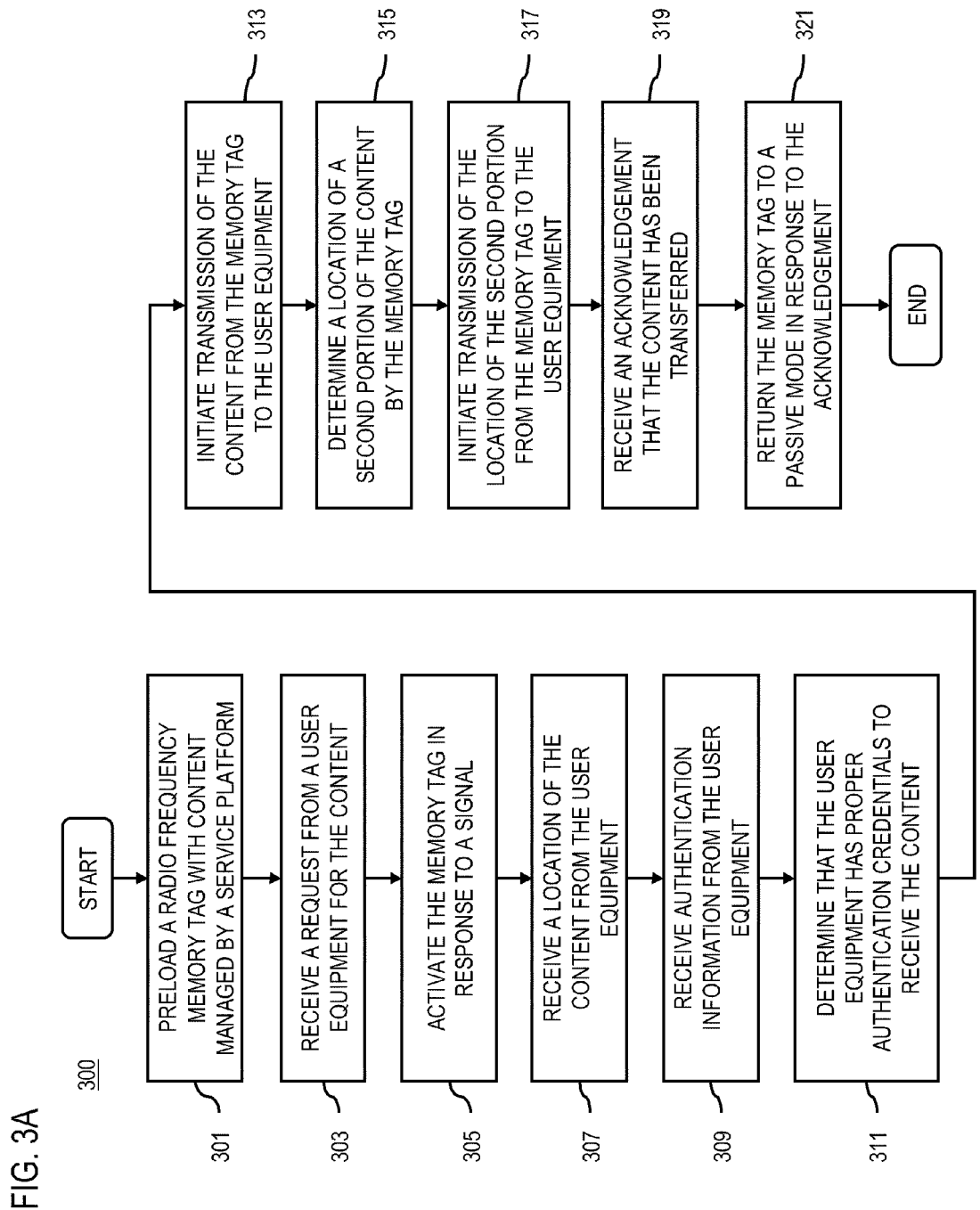

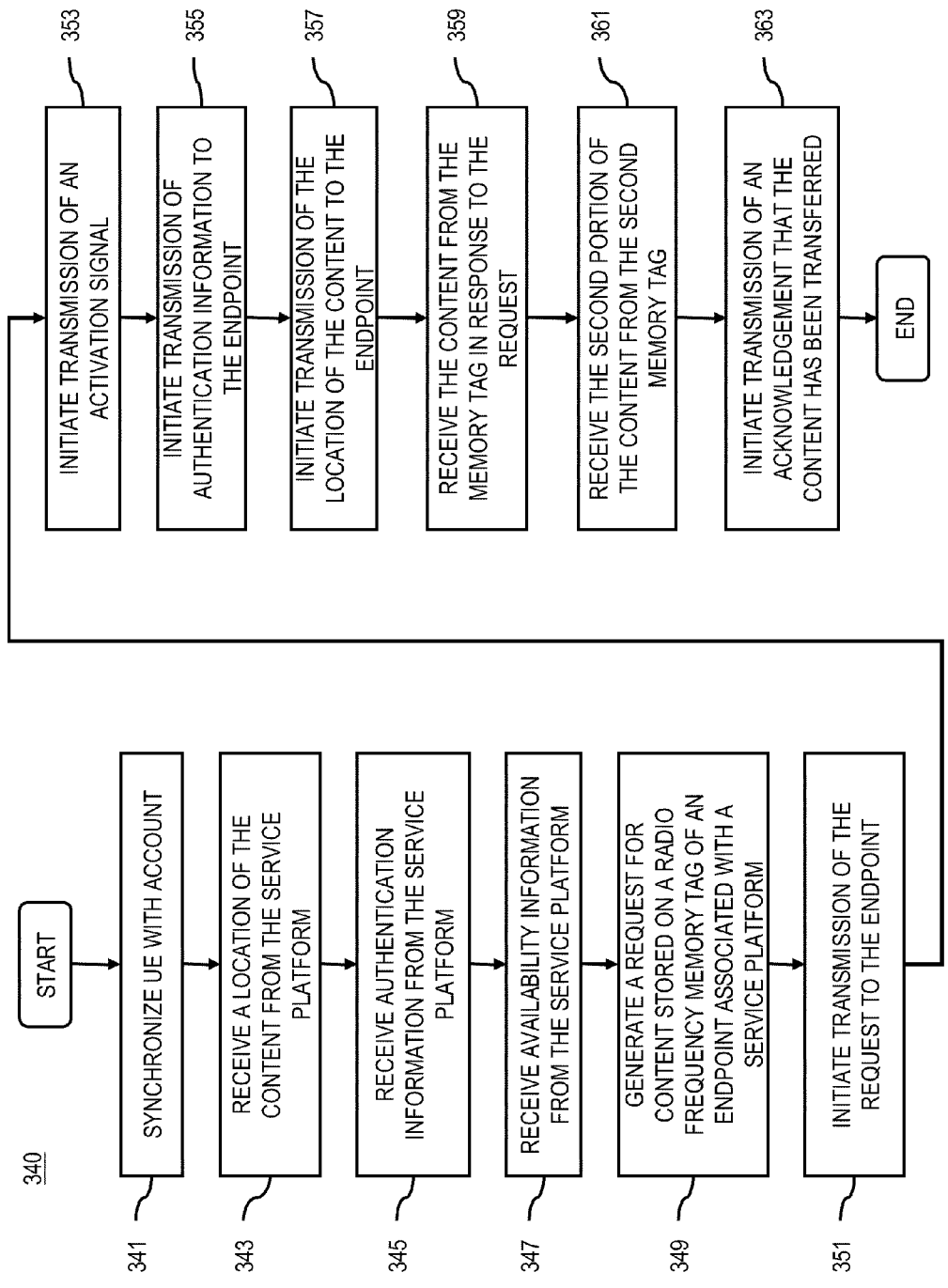

METHOD AND APPARATUS FOR RETRIEVING CONTENT VIA A SERVICE ENDPOINT

BACKGROUND

Service providers and device manufacturers are continually challenged to deliver value and convenience to consumers by, for example, providing compelling network services. These services can include selling and distributing content. However, these services often lack effective and efficient ways to distribute content.

SOME EXAMPLE EMBODIMENTS

According to one embodiment, a method comprises preloading a radio frequency memory tag with content managed by a service platform. The method also comprises receiving a request from a user equipment for the content. The method further comprises initiating transmission of the content from the memory tag to the user equipment.

According to another embodiment, an apparatus comprising at least one processor, and at least one memory including computer program code, the at least one memory and the computer program code configured to, with the at least one processor, cause the apparatus to preload a radio frequency memory tag with content managed by a service platform. The apparatus is also caused to receive a request from a user equipment for the content. The apparatus is further caused to initiate transmission of the content from the memory tag to the user equipment.

According to another embodiment, a computer-readable storage medium carrying one or more sequences of one or more instructions which, when executed by one or more processors, cause an apparatus to preload a radio frequency memory tag with content managed by a service platform. The apparatus is also caused to receive a request from a user equipment for the content. The apparatus is further caused to initiate transmission of the content from the memory tag to the user equipment.

According to another embodiment, an apparatus comprises means for preloading a radio frequency memory tag with content managed by a service platform. The apparatus also comprises means for receiving a request from a user equipment for the content. The apparatus further comprises means for initiating transmission of the content from the memory tag to the user equipment.

According to one embodiment, a method comprises generating a request for content stored on a radio frequency memory tag of an endpoint associated with a service platform. The method also comprises initiating transmission of the request to the endpoint. The method further comprises receiving the content from the memory tag in response to the request.

According to another embodiment, an apparatus comprising at least one processor, and at least one memory including computer program code, the at least one memory and the computer program code configured to, with the at least one processor, cause the apparatus to generate a request for content stored on a radio frequency memory tag of an endpoint associated with a service platform. The apparatus is also caused to initiate transmission of the request to the endpoint. The apparatus is further caused to receive the content from the memory tag in response to the request.

According to another embodiment, a computer-readable storage medium carrying one or more sequences of one or more instructions which, when executed by one or more processors, cause an apparatus to generate a request for content stored on a radio frequency memory tag of an endpoint associated with a service platform. The apparatus is also caused to initiate transmission of the request to the endpoint. The apparatus is further caused to receive the content from the memory tag in response to the request.

According to another embodiment, an apparatus comprises means for generating a request for content stored on a radio frequency memory tag of an endpoint associated with a service platform. The apparatus also comprises means for initiating transmission of the request to the endpoint. The apparatus further comprises means for receiving the content from the memory tag in response to the request.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3A is a flowchart of a process for dispensing content via a service endpoint, according to one embodiment;

FIG. 3B is a flowchart of a process for retrieving content via a service endpoint, according to one embodiment;

DESCRIPTION OF SOME EMBODIMENTS

A method and apparatus for retrieving content via a service endpoint are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
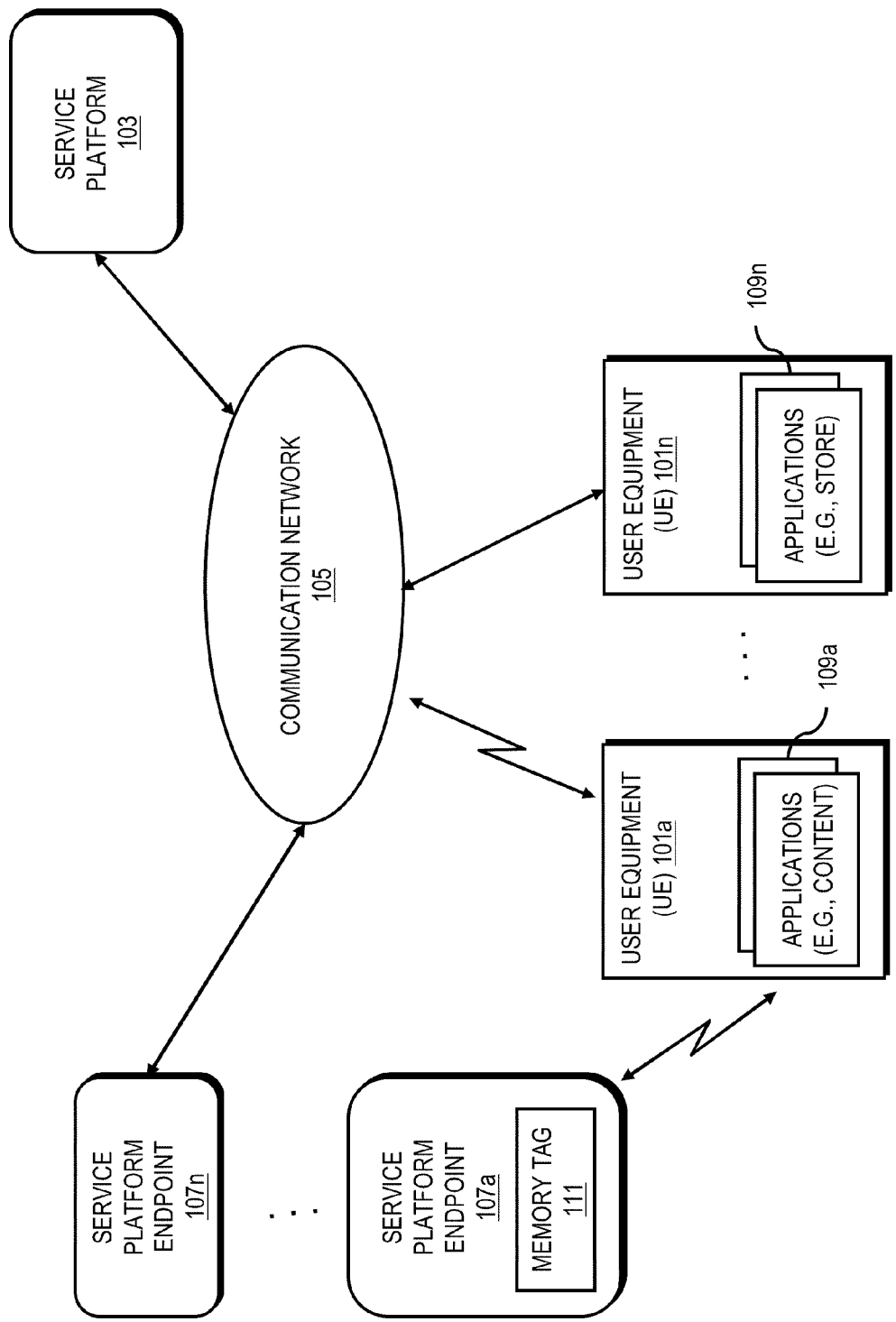
FIG. 1 is a diagram of a system capable of retrieving content via a service endpoint, according to one embodiment.

FIG. 1 is a diagram of a system capable of retrieving content via a service endpoint, according to one embodiment. Users can purchase or be authorized to retrieve content via an internet-based service using user equipment (UE) 101 and a connection to the service. However, due to connection restrictions (e.g., rates, bandwidth, costs, etc.) and/or connection failures (e.g., out of range, out of country service area, etc.) it is not feasible to guarantee connection to the service.

To address this problem, a system 100 of FIG. 1 introduces the capability to retrieve content ordered through the service via a service endpoint containing or having access to the content. In some embodiments, the content can be preloaded to the service endpoint. Additionally, the service endpoint can be bounded to a location and can provide a reliable connection to a user. Thus, instead of transmitting data from a service connectivity facility (e.g., a web server) via long distances, the user can use a local delivery channel (e.g., a service endpoint) with the preloaded content. In one embodiment, the service endpoint includes an image of a set of the information contained by the service. In another embodiment, the service endpoint stores information such as the image using a radio frequency (RF) memory tag infrastructure. A population of RF memory tags can form the service endpoint. Thus, the image can be stored among the population by scattering copies of collaborating agents to the tags. An agent can be a pointer or a process that runs on memory tags and on a memory tag reader to provide positional knowledge to enhance collaboration.

Under the scenario of FIG. 1, the system 100 includes UEs 101a-101n having connectivity to a service platform 103 via a communication network 105. Additionally, the UE 101 can communicate with a service platform endpoint 107a-107n via wireless or a wired communication. The service platform endpoint 107 can have access to the service platform 103 via the communication network 105 or can be operated in a solitary or stand-alone mode of operation. In one embodiment, the service platform 103 and service platform endpoint 107 can include content such as music, video, other media, applications, games, or the like that can be bought, subscribed to, or consumed for free. The UE 101 can utilize a content application 109a or a store application 109n to access the services of a service platform 103. The service platform endpoint 107a can utilize a RF memory tag 111 to store information as well as transmit information to a UE 101. The UE 101 may include one or more readers capable of reading the RF memory tags 111.

By way of example, radio frequency technologies are short range wireless communication technologies that enable the exchange of data between devices over short distances (e.g., a range of 4 inches to 3 yards). In general, these technologies comprise two primary components, a tag (e.g., attached to an object or service platform endpoint 107) and a reader (which can be implemented with the UEs 101a-101n). Communication between the reader and the tags occur wirelessly and may not require a line of sight between the devices. The tag is, for instance a small microchip that is attached to an antenna. The tags can vary in sizes, shapes, and forms and can be read through many types of materials.

Moreover, the tags may be passive tags or active tags. Passive tags are generally smaller, lighter, and less expensive than active tags. Passive tags are activated when within the response range of a reader. The reader emits a low-power radio wave field that is used to power the tag so as to pass on any information that is contained on the chip. Some passive tags operate, e.g., below a 100 MHz frequency and the main transfer energy is carried by a magnetic field. A magnetic field can generate voltage in an antenna coil that can be used as a power supply. Additionally, high frequency passive tags that operate at, e.g., 900 MHz and 2.45 GHz ranges can be used. These high frequency tags can support a faster data stream (e.g., 1.6 Mb/s or 2 Mb/s data streams). In one example, two signals are transmitted by the reader, a power signal and a data signal. Active tags differ in that the tags incorporate their own power source to transmit rather than reflect radio frequency signals. Accordingly, active tags enable a broader range of functionality like programmable and read/write capabilities.

A reader typically contains a transmitter, receiver, control unit, and an antenna. The reader performs three primary functions: energizing the tag, demodulating and decoding the returned radio signal. In certain embodiments, a reader includes an additional interface to convert the returned radio signal to a form that can be passed to another system such as a computer or programmable logic controller.

In one embodiment, a UE 101 can access (e.g., purchase, request, order, etc.) content from a service platform 103 via the communication network 105. The UE 101 (e.g., a personal computer or mobile device) can access the content for the UE 101 itself or for another UE 101 (e.g., a mobile device). The UE 101 can then, for instance, synchronize with the service platform 103 to obtain agents that can be used to retrieve the content from a service platform endpoint 107. In some embodiments, the service platform endpoint 107 already has the content preloaded. In other embodiments, the service platform endpoint 107 is sent the content from the service platform 103 after the order is completed. In this embodiment, the service platform 103 can send the UE 101 availability information that informs the UE 101 of when the information will be available on the service platform endpoint 107. In one example, the UE 101 can retrieve the content from one of many service platform endpoints 107. In this example, the content can be common to multiple service platform endpoints 107, thus not requiring data to be transmitted from a service platform 103 to a service platform endpoint 107. A user can check to see if a particular static service platform endpoint 107 (e.g., one without a connection to a service platform 103) has the specific content. To receive the content, the UE 101 can then retrieve location and/or authentication information for the content from multiple service platform endpoints 107.

In another example, the UE 101 can retrieve content directly from among a plurality of service platform endpoints 107. In this example, the UE 101 can order the content from a service platform 103. Then, the UE 101 can receive agents that can be used to retrieve content from each of the service platform endpoints 107. In this example, different content can be received at each location. For example, a user can plan a trip to a city to visit museums and monuments. The user can order tourist content for the city and then have the option to retrieve content at museums or landmarks that the tourist actually visits. Service platform endpoints 107 may be located throughout the city.

As shown in FIG. 1, the system 100 comprises a user equipment 101 having connectivity to a service platform 103 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

By way of example, the UE 101 and the service platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2A:
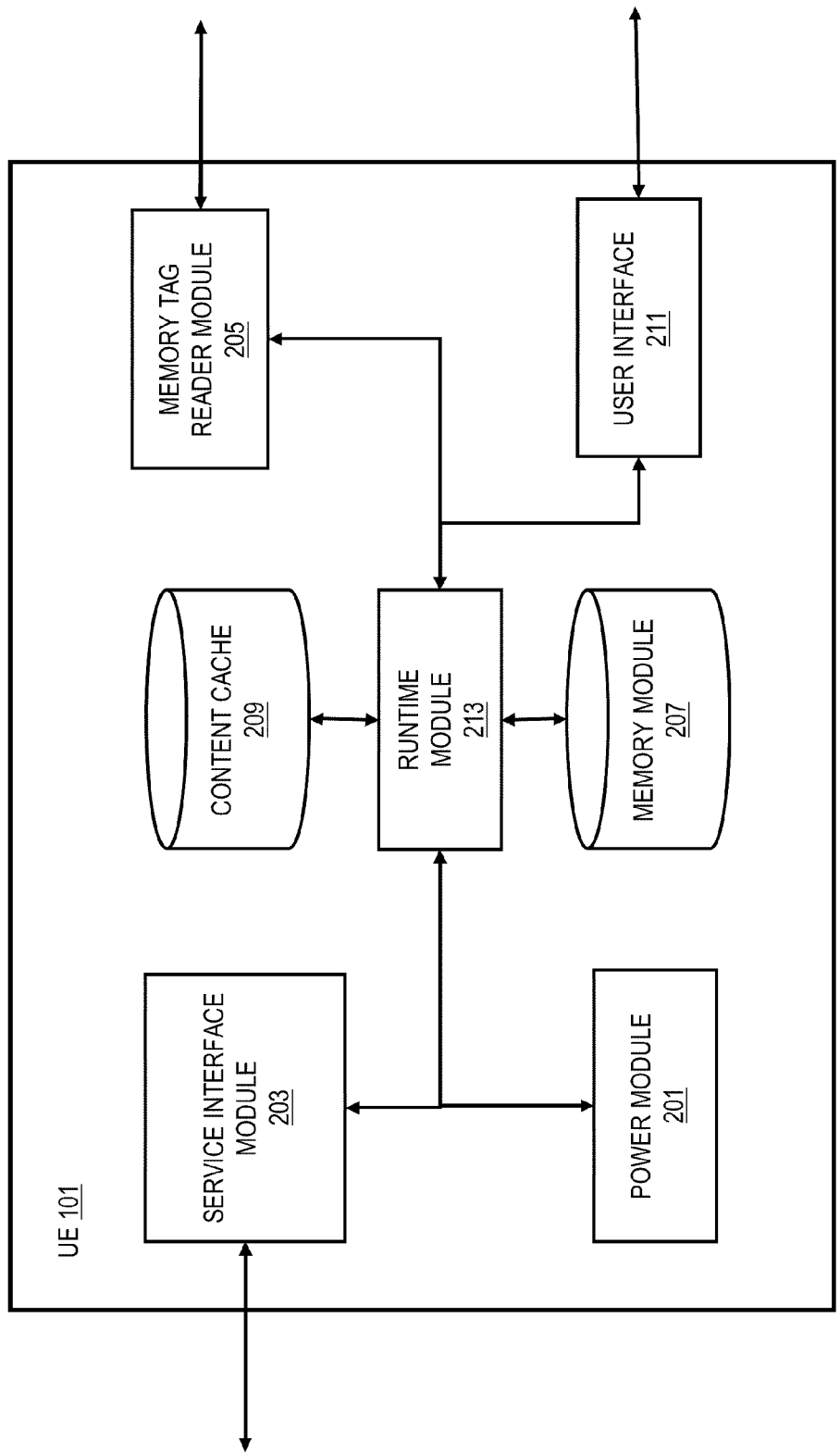
FIG. 2A is a diagram of the components of a user equipment capable of retrieving content via a service endpoint, according to one embodiment.

FIG. 2A is a diagram of the components of user equipment 101 capable of retrieving content via a service endpoint, according to one embodiment. By way of example, the UE 101 includes one or more components for retrieving content via a service platform endpoint 107. It is contemplated that the functions of these components may be combined in one or more components or performed by other components of equivalent functionality. In this embodiment, the UE 101 includes a power module 201, a service interface module 203, a memory tag reader module 205, a memory module 207, a content cache 209, a user interface 211, and a runtime module 213.

The power module 201 provides power to the UE 101. The power module 201 can include any type of power source (e.g., battery, plug-in, etc.). Additionally, the power module can provide power to the components of the UE 101 including processors, memory, and transmitters.

In one embodiment, a UE 101 includes a service interface module 203. The service interface module 203 is used by the runtime module 213 to communicate with a service platform 103. In some embodiments, the service interface module 203 can be used to access, request, or purchase content from the service platform 103. Additionally, the service interface module 203 can synchronize the UE 101 with a corresponding member account associated the service platform 103. During the synchronization process, the UE 101 receives data that can be used to retrieve content from a service platform endpoint 107. The data can include services that provide information about an area of passive information of a service platform endpoint 107 allowing searching over that area. The area information can include an index or other file system location information that can determine where the content is stored. This area information can be stored by the runtime module 213 in a memory module 207.

In one embodiment, a UE 101 includes a user interface 211. The user interface 211 can include various methods of communication. For example, the user interface 211 can have outputs including a visual component (e.g., a screen), an audio component, a physical component (e.g., vibrations), and other methods of communication. User inputs can include a touch-screen interface, a scroll-and-click interface, a button interface, etc. A user can input a request to upload or receive data and applications via the user interface 211. Additionally, the user interface 211 may be used to request synchronization from the service platform 103 or content from the service platform endpoint 107.

In one embodiment, a UE 101 includes a memory tag reader module 205. The memory tag reader module 205 can include an antenna and transceiver to send and receive data from a memory tag 111. The memory tag reader module 205 can also include a second antenna and transceiver to send power to a passive memory tag 111. A runtime module 213 can receive information from the memory tag reader module 205 and store the information in a memory module 207. Additionally, the runtime module 213 can store content read or received by the memory tag reader module 205 in a content cache 209. In one example, the content is an application and the runtime module 213 can execute the application. In another example, the content is a media object and the runtime module 213 can play or display the media object via the user interface 211.

Figure 2B:
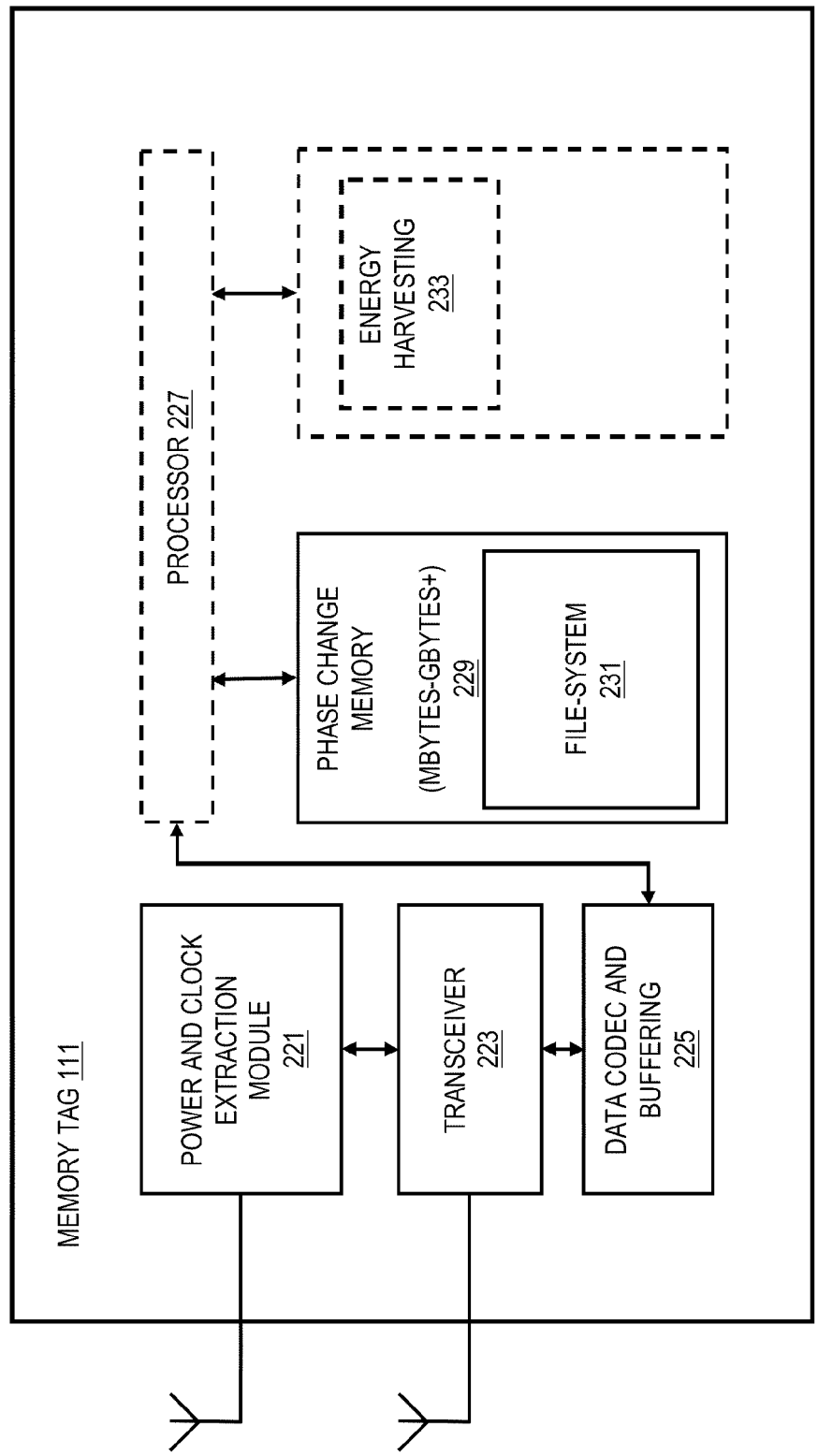
FIG. 2B is a diagram of the components of a memory tag for use in a service endpoint, according to one embodiment.

FIG. 2B is a diagram of the components of a memory tag 111 for use in a service endpoint, according to one embodiment. By way of example, the memory tag 111 includes one or more components for providing content or providing access to content to a UE 101. In one embodiment, the memory tag 111 is included within the service platform endpoint 107. It is contemplated that the functions of these components may be combined in one or more components or performed by other components of equivalent functionality. In this embodiment, the memory tag 111 can include a power and clock extraction module 221, a transceiver 223, a data codec and buffering module 225, a processor 227, a phase change memory 229, a file system 231, and an energy harvesting module 233.

In certain embodiments, the phase change memory 229 is a type of memory that can retain stored information even when not powered. It is contemplated that other non-volatile candidate memory technology can be utilized in addition to or in place of the phase change memory 229. Examples of memory technologies capable of being considered non-volatile candidate memory include Phase change memory (PRAM) 229, Resistive RAM (ReRAM), Magnetic RAM (MRAM), solid-electrolyte (SE) memory, Ferroelectric RAM (FeRAM), organic and polymer memory. Additionally, these technologies can enable a radio frequency memory tag based environment to provide efficient, seamless utilization by the UE 101 as it moves from reading one memory block to another. Memory devices respectively based on any one of these memory technologies can have its own respective response time and data persistence characteristics unique to the respective technology. There may also be other respective memory characteristics, such as requirements for error correction codes (ECC), signal patterns, or data formatting that can be of beneficial use in various embodiments.

In one example, the memory tag 111 has a power and clock extraction module 221. A reader device (e.g., a UE 101) can send a continuous wave signal that can be received by the power and clock extraction module 221 to generate a voltage supply using an energy harvesting module 233. The energy harvesting module 233 can include an antenna coil to produce a magnetic field to transfer energy. In other examples, the energy harvesting module 233 can use a battery, other power harvesting methods (e.g., harvesting light energy) or another power supply. The clock used by the power and clock extraction module 221 can come from the same signal used for power generation or a different signal transmitted by the reader device. The clock can be used by a transceiver 223 to send and receive data to the reader device. A data codec and buffering module 225 can be used to access a phase change memory 229. In some embodiments, a processor 227 (e.g., a simple finite state machine, a microcontroller, or other processor) can control the transceiver 223, the data codec and buffering module 225, and interface with the phase change memory 229. Phase change memory 229 can range from bytes to megabytes to gigabytes or more. The phase change memory 229 can also have a file system 231. Additionally, the file system 231 can be an index or be included in metadata of phase change memory 229. Agents located on one phase change memory 229 can point to additional data located on a second phase change memory 229.

FIG. 3A is a flowchart of a process for dispensing content via a service endpoint, according to one embodiment. In one embodiment, the service platform endpoint 107 performs the process 300 and is implemented in, for instance, a chip set including a processor and a memory as shown FIG. 6. In one embodiment, the service platform endpoint 107 is associated with one or more memory tags 111 to perform the process 300. In other embodiments, the service platform endpoint 107 is a memory tag 111 including a processor capable of performing the process 300. In the process 300, the service platform endpoint 107 makes content available for purchase, request, order, or access. By way of example, the content can be tied to a user account administered by the service platform 103. This can be achieved by modifying an account profile to include a flag identifying the content as requested and available to the user.

At step 301, the service platform endpoint 107 preloads the content (e.g., media files, document files, web links, etc.) onto one or more RF memory tags 111 associated with the service platform endpoint 107. In one embodiment, the content may be preloaded by the service platform 103 or the service provider at a factory or other facility before installation of the memory tags 111 at the service platform endpoint 107. It is also contemplated that the memory tags 111 may be updated with new content periodically or as new content becomes available. More specifically, the service platform endpoint 107 may have connection to the service platform 103 over the communication network 105 to obtain and/or receive new or updated content from the service platform 103. The service platform endpoint 107 then directs a microcontroller or other processor 227 of the memory tag 111 to store the content (e.g., existing, new, or updated content) in, for instance, the phase change memory 229 of the memory tag 111.

By way of example, the service platform endpoint 107 may be a kiosk located at shopping center offering a variety of music downloads linked to multiple memory tags 111 displayed or affixed to the kiosk. In one embodiment, the service platform 103 manages the specific content offered at the service platform endpoint 107. In other words, the service platform 103 can transmit (e.g., via the communication network 105) or otherwise deliver the content or updates to the content to the service platform endpoint 107 for loading onto the one or more memory tags 111 associated with the endpoint 107. The content on a single memory tag 111 can be a subset of a complete content and the memory tag 111 can have information about another memory tag 111 (e.g., associated with either the same service platform endpoint 107 or another service platform endpoint 107) that contains another portion of the complete content. For example, a self-guided tour of a city may be purchased from the service platform 103 and delivered via multiple memory tags 111 associated with multiple service platform endpoints 107 located throughout the city. In this way, as a user tours the city, the user can retrieve additional guide content as the user moves from one location to the next.

At step 303, the service platform endpoint 107 receives a request from the UE 101 for access (e.g., purchase, request, order, etc.) to the content available at the endpoint 107. For example, the request can include a signal to activate a memory tag 111 of the service platform endpoint 107 and to initiate a process for reading the content of the requested memory tag 111. Generally, the memory tags 111 of the service platform endpoint 107 are in a passive state (e.g., an unpowered state in which the content of the memory tag 111 cannot be read) by default. Then, at step 305, the service platform 107 may activate the memory tag(s) 111 corresponding to the request based on the received signal. In other embodiments, the signal itself can activate (e.g., provide power via an RF carrier wave) the memory tag 111 so that the memory tag 111 can be placed in a state to dispense content to the requesting UE 101.

Next, at step 307, the service platform endpoint 107 can (e.g., as part of the request) receive a location of the content from the user equipment. The endpoint 107 can then use this location information to more efficiently and specifically initiate the transmission of the content from the appropriate memory tag 111. In one embodiment, the location of the content can refer to the specific phase change memory 229 bank that contains the content when the memory tag 111 includes multiple phase change memories 229, or to the specific memory tag 111 that contains the content when the service platform endpoint 107 is associated with multiple memory tags 111. In one embodiment, the service platform 103 can provide the content location information to the user equipment to direct the user equipment to the appropriate phase change memory 229 or memory tag 111 containing the content. For example, a user equipment may access a content directory of the service platform 103 to search for content. In response, the service platform 103 indicates to the user the content location associated with an endpoint 107 from which the user equipment may obtain the content.

Additionally, at step 309, the received request can provide information for authenticating that the UE 101 to access to the requested content. In one embodiment, the memory tag 111 of the service platform endpoint 107, at step 311, can determine whether the UE 101 has proper authentication credentials to receive the content. The service platform endpoint 107 can determine if the proper authentication credentials are met by, for instance, comparing the received credentials to a set of authorization rules. In one embodiment, the runtime module 213 of the UE 101 can provide authentication information via the memory tag reader module 205 and then request a copy of a file system 231 of the service platform endpoint 107 to locate the content. This can help synchronize gaps in storage locations between the information the UE 101 obtained from the service platform 103 and the current state of information at the service platform endpoint 107. The service platform endpoint 107 can then buffer and transmit the content via the memory tags 111. In certain embodiments, the service platform endpoint 107 may include or be associated with active memory tags 111 (e.g., memory tags with self-contained power supplies). The service platform endpoint 107 can have a power supply whether the memory tags 111 associated with the endpoint 107 are passive or active. In the scenario of an active service platform endpoint 107 using active RF memory tags 111, actions between the UE 101 and memory tag 111 can be more interactive. Additionally, the active service platform endpoint 107 can search the memory tags 111 for the content. Interactions between the UE 101 and the service platform endpoint 107 can be similar to interactions between the UE 101 and the service platform 103. For example, in some embodiments, it is contemplated that the active memory tags 111 have sufficient computational power to host an agent and/or content to provide functionality equivalent to that of the service platform 103.

Next, at step 313, the service platform endpoint 107 initiates transmission of the content from the memory tag 111 to the user equipment 101. In one embodiment, the transmission can be based at least in part on a determination of whether the UE 101 is authorized to retrieve the content. The service platform endpoint 107 can gather information about the location of the content (e.g., the phase change memory 229 or memory tag 111 containing the content) from information received from the UE 101. The service platform endpoint 107 can then prioritize the transaction process based on the location information. The prioritization of the transaction process (e.g., searching for and buffering content data to be sent) can be driven by either the UE 101 (e.g., via a transceiver and finite state machine of a memory tag 111) or the service platform endpoint 107. By way of example, the service platform endpoint 107 initiates transmission of the first portion of the requested content from the memory tag 111 to the UE 101. At step 315, the endpoint 107 determines that a second portion of the requested content is available on another memory tag 111 and initiates transmission of the location of the second portion of the content to the UE 101 (step 317). The runtime module 213 of the UE 101 then uses this information to drive the process of receiving the remaining content. The information exchange between the service platform endpoint 107 and the UE 101 can be via a scheduler loop used by the UE 101 to retrieve information across multiple memory tags 111 associated with the service platform endpoint 107. For example, if the location of the second portion of the content is at a different physical location, the endpoint 107 directs UE 101 to the new location. Once the UE 101 reaches the new location, the service platform endpoint 107 at the new location can initiate transmission of the second portion of the content from a memory tag 111 associated with the endpoint 107 at the new location. At step 319, the service platform endpoint 107 finalizes the information exchange using a message exchange (e.g., a transaction complete acknowledgement) received from the UE 101. In one embodiment, at step 321, the service platform endpoint 107 and the memory tags 111 associated with the service platform endpoint 107 can be returned to a passive stage once the information exchange is finalized. This passive stage can save energy costs for the service platform endpoint 107.

With the above approach, a service platform endpoint 107 can dispense content to a UE 101 via a RF memory tag 111 interface. This can reduce the energy, time, resource, and monetary costs of completing the transfer from a service platform 103 to the UE 101. Additionally, the user can receive the content in areas with limited service (e.g., where the UE 101 is unable to receive a data connection) to the service platform 103. Thus, the user can access the content from an off-the-band service platform endpoint 107 dispensing the content.

FIG. 3B is a flowchart of a process for retrieving content via a service endpoint, according to one embodiment. In one embodiment, the runtime module 213 of a UE 101 performs the process 320 and is implemented in, for instance, a chip set including a processor and a memory as shown FIG. 6. A user purchases, requests, or orders content from a service platform 103. For example, the user can use a UE 101 or another means (e.g., another UE 101, computer, etc.) to order or purchase the content. In one embodiment, the content is available to the user as part of a service account with the service platform 103 (e.g., a online store such as the Ovi Store).

At step 341, the runtime module 213 synchronizes service information with the service platform 103 according to profile information and preferences associated with the user's account. During the synchronization, the runtime module 213 can, for instance, receive information about the locations of service platform endpoints 107 that offer content from the service platform 103. Alternatively or additionally, the runtime module 213 may select the service platform endpoint 107 from which the user desires to receive content. As discussed earlier, the service platform endpoints 107 are associated with memory tags 111 containing all or a portion of the content available from the service platform 103. By way of example, the runtime module 213 may directly download content from the memory tags 111 of the endpoints 107 without needing a connection (e.g., a data connection) to the service platform 103. Additionally, at step 343, the runtime module 213 can receive information about the location of the content on the service platform endpoint 107. This location information specifies, for instance, the phase change memory 229 or memory tag 111 containing the requested content. Also, at step 345, the runtime module 213 can receive necessary security parameters or authentication information to retrieve the content. Moreover, the runtime module 213 may also receive availability information of the content on the service platform endpoint 107 from the service platform 103 (step 347).

At step 349, the runtime module 213 generates a request for content stored on one or more of the memory tags 111 of a service platform endpoint 107 associated with the service platform 103. The UE 101 can generate the request based on information gathered during the synchronization step 341. For example, the request can include authentication information and/or information specifying the location of the content. The user of the UE 101 can go to the location of the service platform endpoint 107 to retrieve the content.

Next, at step 351, the runtime module 213 initiates transmission of the request to the service platform endpoint 107 via the memory tag reader module 205. In one embodiment, initiating transmission includes sending a power signal to the memory tag 111 and creating a channel via a transceiver. The power signal can additionally serve as an activation signal to activate the service platform endpoint 107. In one embodiment, at step 353, the runtime module 213 transmits an activation signal to the service platform endpoint 107. In another embodiment, the UE 101 need not power the memory tag 111 because either the service platform endpoint 107 or the memory tag 111 includes a power source. The runtime module 213, at step 355, can initiate communications between the UE 101 and service platform endpoint 107 by initiating transmission of authentication information to the service platform endpoint 107. For example, the communications can begin using a Join/Leave message exchange and a corresponding Link redirector message to complete a handshaking authentication procedure. Next, at step 357, the runtime module 213 initiates transmission of the location of the content (e.g., as received from the service platform 103) to the service platform endpoint 107. The service platform endpoint 107 can determine the content to send based on the location information. In one embodiment, the user interface 211 of the UE 101 can display a variant of the service platform 103 user interface during communications between the UE 101 and the service platform endpoint 107 and memory tags 111. In this way, the experience of retrieving content from the service platform endpoint 107 approximates the user experience received when directly accessing the service platform 103.

Then, at step 359, the runtime module 213 can receive the content from the memory tag 111 in response to the request. Additionally, the information exchange can be in the form of a scheduler loop over a transport protocol queue to transfer the entirety of the content. The scheduler loop can be used to retrieve information across multiple memory tags 111 associated with the service platform endpoint 107 or with another service platform endpoint 107. During the scheduler loop, the runtime module 213 can request additional portions of the content which are partitioned across the multiple memory tags 111. The runtime module 213 can receive information about the location of the next portion of the content from the memory tag as part of the response to the request and then request that next portion using the location. Then, at step 361, the runtime module 213 can receive a second portion of the content from a second memory tag. In one embodiment, the runtime module 213 finalizes the information exchange by a message exchange with the memory tag 111 and/or service platform endpoint 107. More specifically, as part of the message exchange, the runtime module 213 initiates transmission of an acknowledgement that the content has been transferred successfully from the memory tag 111 to the UE 101 (step 363). The UE 101, after receiving the content, may refresh its content index and any associated play lists to include the received content.

With the above approach, a user can retrieve content from a service platform endpoint 107 via a memory tag 111 interface. This approach can, for instance, reduce the energy, resource, and monetary costs of completing the transfer over a longer range communication network (e.g., via the cellular service of the communication network 105). Additionally, the user can receive the content in locations with limited long range service or where the long range service is inadequate. The user also can access the content in an intuitive and familiar way by accessing an off-the-band service platform endpoint 107 in a similar manner to accessing a service platform 103.

Figure 4:
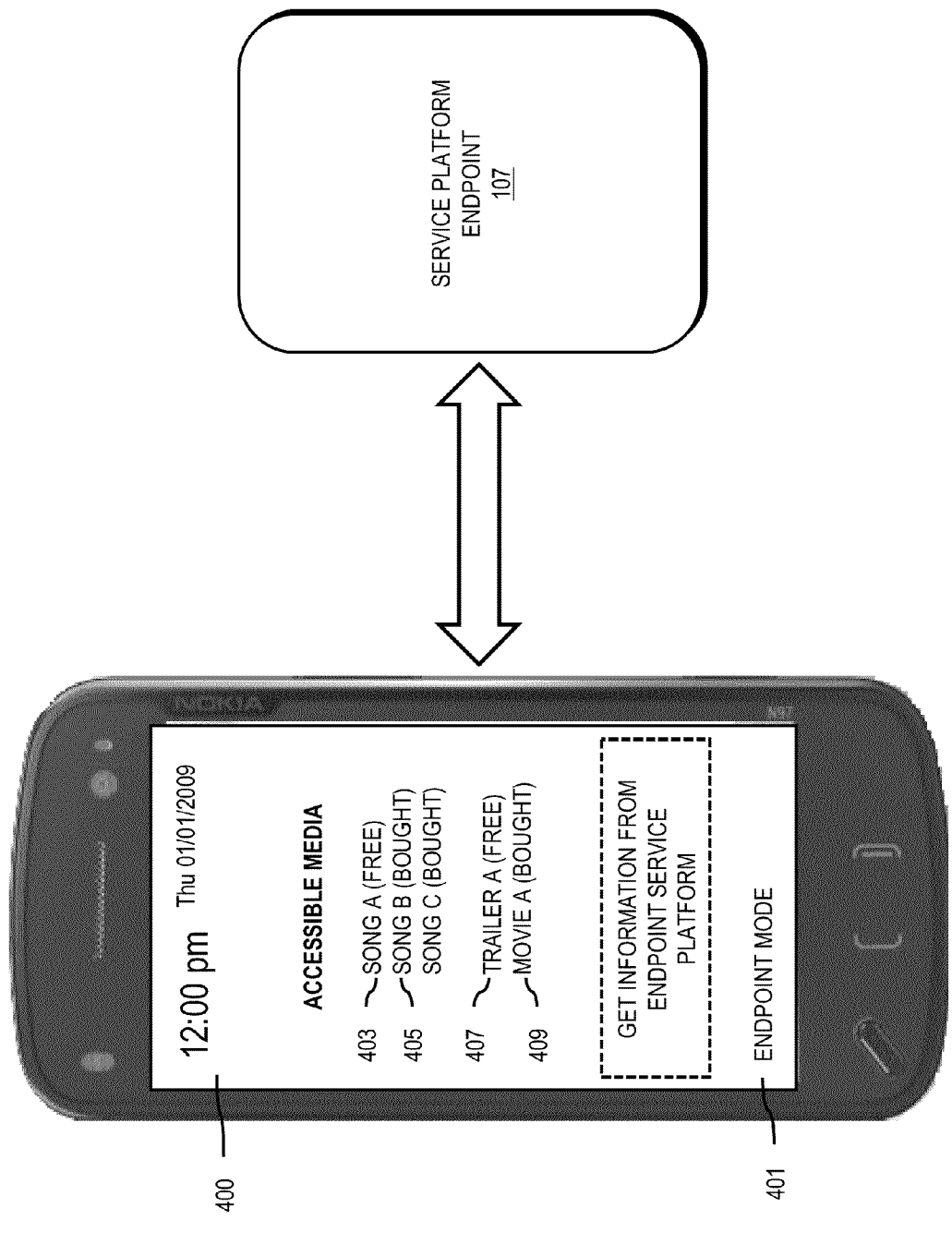
FIG. 4 is a diagram of a user interface utilized in the processes of FIG. 3, according to one embodiment.

FIG. 4 is a diagram of a user interface utilized in the processes of FIG. 3, according to one embodiment. The user interface 400 can be in the form of an interface similar to that used to connect to a service platform 103. Through the user interface 400, the user is able to intuitively access content on a service platform endpoint 107. When the user arrives at a service platform endpoint 107, the user can activate an application 109 to retrieve content. The user interface 400 can display an identifier 401 that indicates that the UE 101 of the user interface 400 is connected to a service platform endpoint 107. Additionally, the user interface 400 can display previously requested content (e.g., a free song 403, a bought song 405, a video trailer 407, or a bought movie 409). The UE 101 can be pre-synchronized with the service platform 103 so that the UE 101 will have information on the location and authentication information for the requested content on the service platform endpoint 107. Thus, a user can order the content at a location unrelated to the service platform endpoint 107 and retrieve the content from the service platform endpoint 107.

The processes described herein for retrieving content via a service endpoint may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
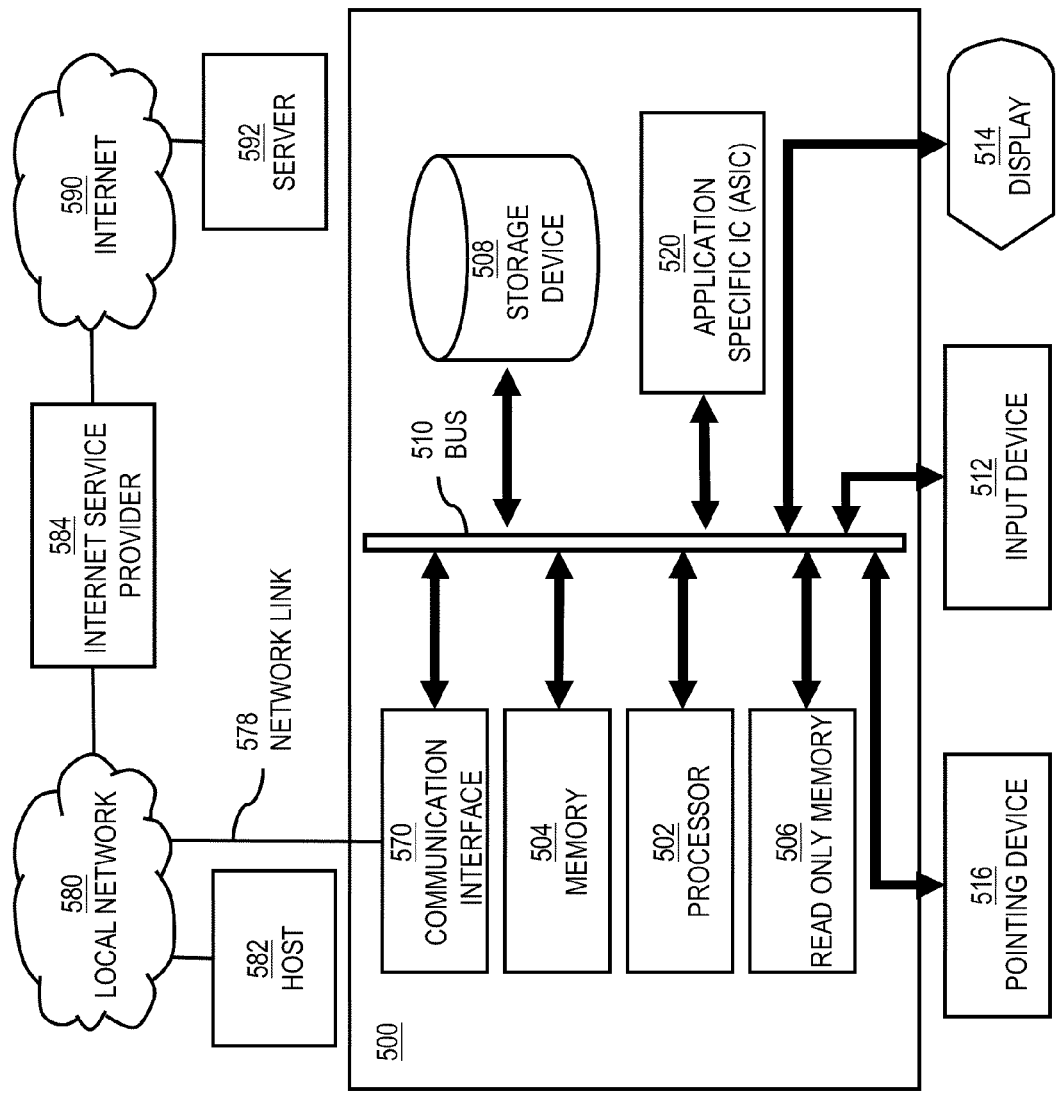
FIG. 5 is a diagram of hardware that can be used to implement an embodiment of the invention.

FIG. 5 illustrates a computer system 500 upon which an embodiment of the invention may be implemented. Computer system 500 is programmed (e.g., via computer program code or instructions) to retrieve ordered content via a service endpoint as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of retrieving ordered content via a service endpoint.

A bus 510 includes one or more parallel conductors of information so that information is transferred quickly among devices coupled to the bus 510. One or more processors 502 for processing information are coupled with the bus 510.

A processor 502 performs a set of operations on information as specified by computer program code related to retrieving ordered content via a service endpoint. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or other dynamic storage device, stores information including processor instructions for retrieving ordered content via a service endpoint. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for retrieving ordered content via a service endpoint, is provided to the bus 510 for use by the processor from an external input device 512, such as a keyboard containing alphanumeric keys operated by a human user, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT) or a liquid crystal display (LCD), or plasma screen or printer for presenting text or images, and a pointing device 516, such as a mouse or a trackball or cursor direction keys, or motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for the UE 101.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server host 592 connected to the Internet hosts a process that provides a service in response to information received over the Internet. For example, server host 592 hosts a process that provides information representing video data for presentation at display 514.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

Figure 6:
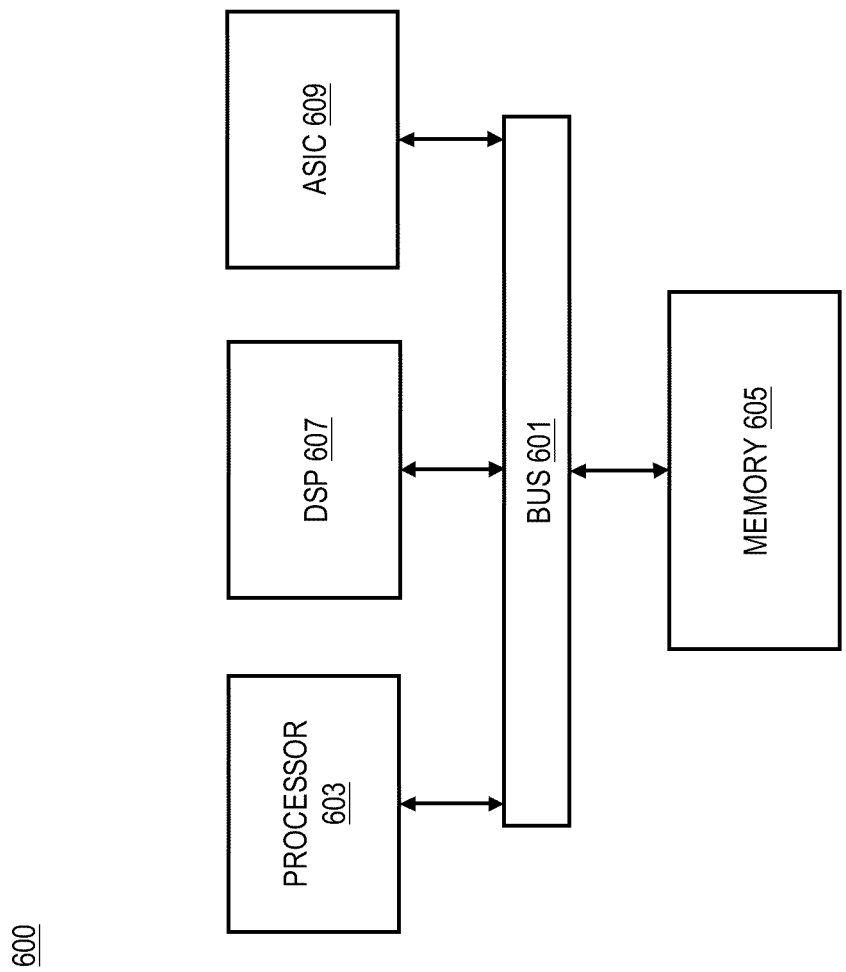
FIG. 6 is a diagram of a chip set that can be used to implement an embodiment of the invention.

FIG. 6 illustrates a chip set 600 upon which an embodiment of the invention may be implemented. Chip set 600 is programmed to retrieve ordered content via a service endpoint as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 600, or a portion thereof, constitutes a means for performing one or more steps of retrieving ordered content via a service endpoint.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to retrieve ordered content via a service endpoint. The memory 605 also stores the data associated with or generated by the execution of the inventive steps.

Figure 7:
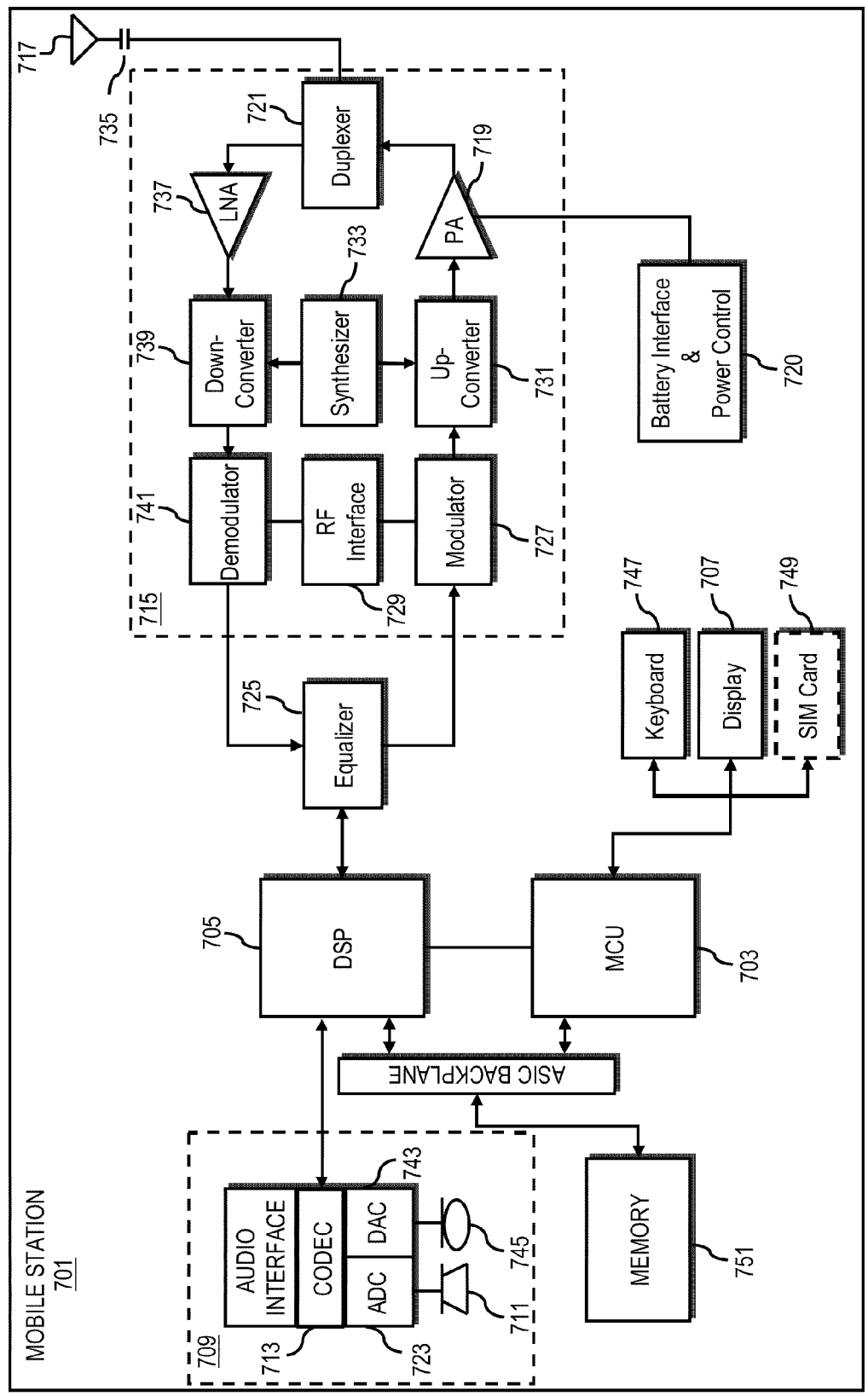
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 700, or a portion thereof, constitutes a means for performing one or more steps of retrieving ordered content via a service endpoint. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as to a combination of processor(s), including digital signal processor(s), software, and memory (ies) that work together to cause an apparatus, such as a mobile phone or server, to perform various functions). This definition of "circuitry" applies to all uses of this term in this application, including in any claims. As a further example, as used in this application, the term "circuitry" would also cover an implementation of merely a processor (or multiple processors) and its (or their) accompanying software/or firmware.

The term "circuitry" would also cover, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that offer automatic contact matching. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703—which can be implemented as a Central Processing Unit (CPU) (not shown).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to retrieve ordered content via a service endpoint. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   preloading a radio frequency memory tag with content managed by a service platform via a communication network, wherein the content comprises content unrelated to the service platform;
   receiving a request for the content from a user equipment configured to communicate with the service platform via the communication network;

initiating transmission of the content from the memory tag to the user equipment; and returning the memory tag to a passive mode.

2. A method of claim 1, further comprising:

activating the memory tag in response to a signal; and receiving an acknowledgement that the content has been transferred, wherein returning the memory tag to the passive mode is in response to the acknowledgement.

3. A method of claim 1, further comprising:

receiving a location of the content from the user equipment, wherein the initiating transmission of the content is based at least in part on the location.

4. A method of claim 3, further comprising:

receiving authentication information from the user equipment; and determining that the user equipment has proper authentication credentials to receive the content, wherein the initiating transmission of the content is based at least in part on the determination.

5. A method of claim 1, wherein the content is a subset of a complete content and wherein a second portion of the complete content is located on a second memory tag, the method further comprising:

determining a location of the second portion by the memory tag; and initiating transmission of the location of the second portion from the memory tag to the user equipment.

6. An apparatus comprising:

at least one processor; and at least one memory including computer program code, the at least one memory and the computer program code configured to, with the at least one processor, cause the apparatus to perform at least the following, preload a radio frequency memory tag with content managed by a service platform via a communication network, wherein the content comprises content unrelated to the service platform;

receive a request for the content from a user equipment configured to communicate with the service platform via the communication network;

initiate transmission of the content from the memory tag to the user equipment; and return the memory tag to a passive mode.

7. An apparatus of claim 6, wherein the apparatus is further caused to:

activate the memory tag in response to a signal; and receive an acknowledgement that the content has been transferred, wherein the return of the memory tag to the passive mode is in response to the acknowledgement.

8. An apparatus of claim 6, wherein the apparatus is further caused to:

receive a location of the content from the user equipment, wherein the initiating transmission of the content is based at least in part on the location.

9. An apparatus of claim 8, wherein the apparatus is further caused to:

receive authentication information from the user equipment; and determine that the user equipment has proper authentication credentials to receive the content, wherein the initiating transmission of the content is based at least in part on the determination.

10. An apparatus of claim 6, wherein the content is a subset of a complete content, wherein a second portion of the complete content is located on a second memory tag, and wherein the apparatus is further caused to:

determine a location of the second portion by the memory tag; and initiate transmission of the location of the second portion from the memory tag to the user equipment.

11. A method comprising:

generating a request for content stored on a radio frequency memory tag of an endpoint associated with a service platform via a communication network, wherein the content comprises content unrelated to the service platform;

initiating transmission of the request to the endpoint; and receiving the content from the memory tag in response to the request.

12. A method of claim 11, further comprising:

initiating transmission of an activation signal; and initiating transmission of an acknowledgement that the content has been transferred.

13. A method of claim 11, further comprising:

receiving a location of the content from the service platform; and initiating transmission of the location of the content to the endpoint.

14. A method of claim 11, further comprising:

receiving authentication information from the service platform;

receiving availability information from the service platform; and initiating transmission of the authentication information to the endpoint.

15. A method of claim 11, wherein the content is a subset of a complete content and wherein a second portion of the complete content is located on a second memory tag of the endpoint, the method further comprising:

receiving the second portion of the content from the second memory tag.

16. An apparatus comprising:

at least one processor; and at least one memory including computer program code, the at least one memory and the computer program code configured to, with the at least one processor, cause the apparatus to perform at least the following, generate a request for content stored on a radio frequency memory tag of an endpoint associated with a service platform via a communication network, wherein the content comprises content unrelated to the service platform;

initiate transmission of the request to the endpoint; and receive the content from the memory tag in response to the request.

17. An apparatus of claim 16, wherein the apparatus is further caused to:

initiate transmission of an activation signal; and initiate transmission of an acknowledgement that the content has been transferred.

18. An apparatus of claim 16, wherein the apparatus is further caused to:

receive a location of the content from the service platform; and initiate transmission of the location of the content to the endpoint.

19. An apparatus of claim 16, wherein the apparatus is further caused to:

receive authentication information from the service platform;

receive availability information from the service platform; and initiate transmission of the authentication information to the endpoint.

20. An apparatus of claim 16, wherein the content is a subset of a complete content, wherein a second portion of the complete content is located on a second memory tag of the endpoint, and wherein the apparatus is further caused to:

receive the second portion of the complete content from the second memory tag.

* * * * *